United States Patent

[11] 3,594,924

| [72] | Inventor | Kenneth H. Baker<br>State College, Pa. |
|---|---|---|
| [21] | Appl. No. | 836,276 |
| [22] | Filed | June 25, 1969 |
| [45] | Patented | July 27, 1971 |
| [73] | Assignee | Nasco Industries Inc.<br>Ft. Atkinson, Wis. |

[54] DNA-RNA TEACHING AID
2 Claims, 3 Drawing Figs.

[52] U.S. Cl. ..................................................... 35/18 A
[51] Int. Cl. ..................................................... G09b 23/26
[50] Field of Search .......................................... 35/18 A,
18.5, 20; 248/121, 44; 46/25, 27

[56] References Cited
UNITED STATES PATENTS
2,570,625  10/1951  Zimmerman et al. .......... 35/71 X
3,296,714  1/1967  Klote ............................. 35/18

OTHER REFERENCES

Scrace Teaching Aids Co. catalogue entitled " STA Models for Science," rec'd Sci. Library, Oct. 1964, pp. 16— 17.
Sears Christmas Book 1968, P.438

*Primary Examiner*—Lawrence Charles
*Assistant Examiner*—L. Anten
*Attorney*—Parker, Carter & Markey ABSTRACT: A model for representing chemical structures such as deoxyribonucleic acid and the like, and including a combination of individual units with projections and apertures formed as part of the units whereby the apertures are adapted to receive and removably retain the projections in a manner permitting relative movement between adjacent units within the model. One alternative embodiment includes the use of permanent magnets formed as a part of the units for connecting the units together in lieu of the projections and apertures. Means are provided for supporting the units in a desired shape.

PATENTED JUL 27 1971 3,594,924

INVENTOR.
Kenneth H. Baker
BY Parker, Carter & Markey
Attorneys.

DNA-RNA TEACHING AID

SUMMARY OF THE INVENTION

This invention relates to a model for representing chemical structure.

A primary object of this invention is a model for representing chemical structure that is suited for educational use.

Another object is a model that has flexibility and adaptability whereby individual units within the model can be connected to represent many varied chemical structures.

Another object is a model that has easily separable units for representing chemical change by proper separation of the units.

Another object is the model that can accurately represent the deoxyribonucleic acid structure, its division and its synthesis with ribonucleic acid.

Another object is a model with a simple design and easy assembly.

Another object is a model that has units representing substructures of a chemical structure that are easily distinguishable because of combinations of shape, size and color.

Another object is a model having a construction that is easily disassembled and stored.

Other objects will be apparent in the ensuing specification and drawings.

DESCRIPTION OF THE PREFERRED EMBODIMENT

This invention relates to a model for representing chemical structure, and particularly to the structure of deoxyribonucleic acid and other closely related structures in this area of biochemistry.

Educational systems throughout America have concerned themselves with the teaching of relatively complex concepts considerably earlier in a student's life. To facilitate the learning process, educators have increasingly utilized the advantages of audiovisual aids and other teaching aids. The need for improved and comprehensive teaching aids would certainly include models that accurately reflect chemical structure and processes.

Figure 1:
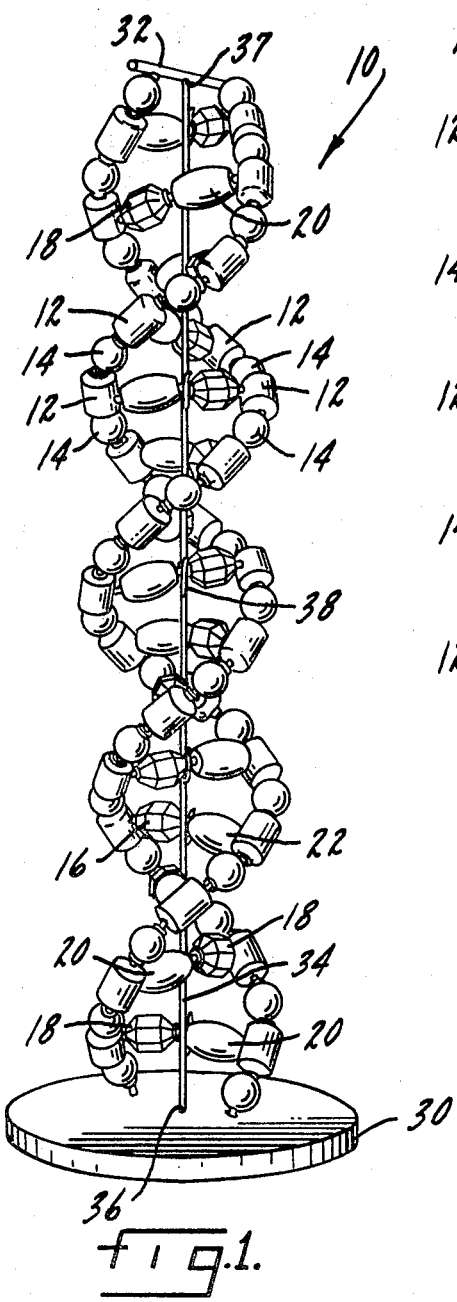
FIG. 1 is a view of the assembled model of a DNA molecule.

The model generally indicated at 10 in FIG. 1 is a three-dimensional representation of deoxyribonucleic acid (DNA). DNA is generally considered to be the carrier of hereditary information in the cell. It is confined to the nucleus and is a significant component of the chromosome, found there in association with protein. As is generally indicated at 10 in FIG. 1 the polymeric molecule is a double-helix of polynucleotides composed of phosphate, deoxyribose, and the nitrogenous bases: adenine, gaunine, cytosine and thymine.

The spiral or double-helix comprises two chains of alternating phosphate 14 and deoxyribose 12 units in continuous linkages or strings. The model is built up or assembled by connecting units or beads representing the various molecular components. Units representing different molecular components such as phosphate or thymine or any of the other molecular components within DNA are easily discernable by reason of various combinations of shape, size and color.

The sugar molecule deoxyribose 12 is distinguishable from other molecular components by virtue of its cylindrical shape and its red color. The molecular components within the pyrimidines classification are represented by a multifacited unit which distinguish them from other units. They are distinguishable from each other because of their differences in color, i.e., the cytosine unit 16 is light blue and the thymine unit 18 is yellow. The molecular components within the purine classification are represented by oval or egg-shaped units which distinguish them from other units and they are also distinguishable from each other by color, i.e., the adenine unit 20 is green and the gaunine unit 22 is pink. Phosphate is represented by a dark blue spherical unit 14.

The DNA model has functional advantages in that the structural detail of the model is directly related to the functional nature of the DNA molecule. In the DNA molecule, nitrogenous bases project toward the axis of the spiral or double-helix and join the chains by hydrogen bonds. Adenine always bonds with thymine, cytosine with gaunine, and conversely, adenine never bonds with cytosine, nor gaunine with thymine. Connection of any of the units within the model is achieved by placement of outwardly extending nodes or projections 24 which are formed as a part of the unit into apertures 26 adapted to receive and removably retain the projections thereby forming an interconnecting relationship between two adjacent units. Units representing molecular components cytosine 16 and adenine 20 have two projections on opposite end portions of the units. Units representing molecular components gaunine 22, phosphate 14 and thymine 18 have a projection and an aperture on opposite end portions of the units, and the unit representing deoxyribose 12 has a projection and an aperture on opposite end portions of the unit and also an aperture on its side. The result of the particular placement of projections and apertures on the units is the prohibition of connection of some units. Connection of the cytosine unit 16 with an adenine unit 20 is prohibited because both units have two projections and no apertures. This is structurally equivalent to the chemical prohibition of bonding between cytosine and adenine.

Figure 3:
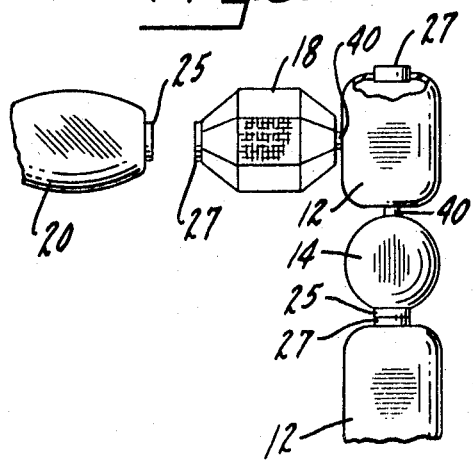
FIG. 3 shows a modification of the connection means of the model of FIG. 1.

A modification of the invention is shown in FIG. 3, where permanent magnets are integrally formed within the units in lieu of the projections and apertures. If one visualizes each of the projections being replaced by a magnet 25 and each of the apertures being replaced by a magnet 27 having the opposite polarity, it will be evident that the structural equivalency is maintained because opposite polarities attract and identical polarities repel. The double helix of FIG. 1 may be formed of 3 unit assemblies such as that shown at 12, 14, 18 in FIG. 3, wherein the individual units are fixedly secured to each other by pegs 40 and the assembly presents magnets 25,27 externally for removable connection with similar 3 unit assemblies.

X-ray photography of the DNA molecule has demonstrated that the spiral or double-helix formed by the two linkages or strings of alternating phosphate and deoxyribose units have a parallel alignment and that distortion of the parallelism does not occur in an actual DNA molecule. This parallelism of the two strings of units with the model of DNA is also maintained when the pairs are inserted in the model in a runglike manner. The length obtained by adding a cytosine unit 16 to a gaunine unit 22 or an adenine unit 20 to a thymine unit 18 establishes the proper spacing between the two strings of units. While a gaunine unit 22 may be connected to an adenine unit 20 the length of these combinations is not equal to the length of the cytosine and gaunine combination and therefore destroys the parallelism of the strings of units when these combinations are connected to the two strings in a runglike manner.

Although the number of nucleotide units in a DNA chain may vary from 3,000 to 10,000,000, the model generally indicated at 10 in FIG. 1, represents only a small segment of that chain. Each of the units in the model measures approximately 1⅜ inches in diameter and range in length from 2 to 2¾ inches. The model is accurate in scale in that one inch of the scale represents approximately 1 angstrom in the DNA molecule.

The model is supported in its desired shape by the use of the supporting structure shown in FIG. 1. The supporting structure has a lower annular plate 30, an upper crossmember 32 and a rod 34 that is removably retained in an annular aperture 36 formed in the lower plate 30, such that the supporting structure is rigid and self-supporting. The rod 34 has outwardly and then upwardly extending hooks 38 positioned along its length, which function as supports for the pairs of units which link the outer strings.

The use, operation and function of the invention are as follows:

The assembly of the supporting structure is accomplished by placing the lower plate 30 on a level surface such that the annular aperture 36 in the plate is in view. The dowel or rod 34 is then inserted into the aperture 36, and the upper crossmember 32 is then attached to the free end of the dowel by inserting the other end of the dowel into the aperture 37 formed in the crossmember 32. The supporting structure is then completely assembled and is ready to receive and support the units comprising the DNA model.

Figure 2:
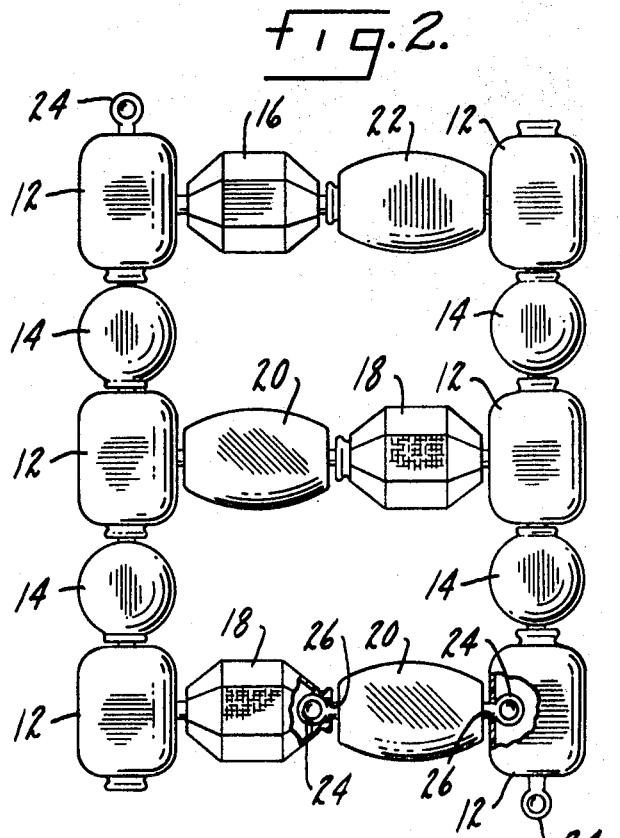
FIG. 2 is an untwisted segment of the model of FIG. 1.

The assembly of the units in the DNA model is a simple and straightforward operation. With the aid of illustrated instructions, the student or assembler connects the units on a level plane by inserting a projection 24 on one unit into an aperture 26 of another unit, thereby connecting the units together. This connection of the units is continued until the proper configuration results. When all units have been connected in the DNA model, the configuration will have a ladderlike shape as is generally indicated in FIG. 2. The assembler then attaches the ends of the two strings of units to either the upper crossmember or the lower plate of the supporting structure, twists the outer strings axially thereby forming a double-helix or spiral, places the connecting pairs of units in the hooks 38 on the rod and attaches the remaining ends of the double-helix.

While the preferred form of the invention has been shown and described, it should be understood that suitable additional modifications, substitutions and alterations may be made by one skilled in the art without departing from the invention's fundamental theme, and that the units could be assembled to represent other chemical structures that are not specifically described or shown.

I claim:

1. A model for representing chemical structures, said model including, in combination, units representing substructures, each of said units having a combination of shape, size and color, whereby the units representing different substructures are distinguishable, connecting means for attaching said units, said connecting means permitting relative movement among said units, means supporting the units whereby the model is maintained in a desired shape, said chemical structures including deoxyribonucleic acid, said chemical structure of deoxyribonucleic acid having a combination of units, the combination including units representing substructures gaunine, cytosine, deoxyribose, thymine, phosphate, and adenine, and two strings of units, said strings of units forming a double helix, having a combination of units representing phosphate alternating with the units representing deoxyribose within each of said strings, said strings being removably connected by pairs of units in a runglike fashion within the double helix, said pair of units being of two types, one type having a unit representing substructure cytosine removably connected to a unit representing substructure gaunine, and another type having a unit representing substructure adenine removably connected to a unit representing thymine, said supporting means including a flat annular plate having an aperture located at the center of said plate, a cylindrical rod having an end portion removably secured in said aperture, and having outwardly and then upwardly extending hooks spaced along the length of said rod for supporting said pairs of units, an upper crossmember having an aperture midway along its length, the other end of said rod being secured in the aperture of said crossmember.

2. The supporting means of claim 1 further characterized in that connecting means are carried on both sides of said aperture in said crossmember, and connecting means are carried on opposite sides of said aperture in said plate, thereby permitting removable connection of the units in said outer strings to said plate and said crossmember.